United States Patent [19]

Freienstein et al.

[11] Patent Number: 4,633,407

[45] Date of Patent: Dec. 30, 1986

[54] METHOD AND DEVICE FOR TARGET TRACKING OF LAND VEHICLES

[75] Inventors: Bernd Freienstein; Ernst Peter Neukirchner; Otmar Pilsak, all of Hildesheim; Dietmar Schlögl, Sibesse, all of Fed. Rep. of Germany

[73] Assignee: Robert Bosch GmbH, Stuttgart, Fed. Rep. of Germany

[21] Appl. No.: 616,230

[22] PCT Filed: Oct. 21, 1983

[86] PCT No.: PCT/DE83/00177

§ 371 Date: May 14, 1984

§ 102(e) Date: May 14, 1984

[87] PCT Pub. No.: WO84/01823

PCT Pub. Date: May 10, 1984

[30] Foreign Application Priority Data

Nov. 6, 1982 [DE] Fed. Rep. of Germany ....... 3241023

[51] Int. Cl.⁴ .............................................. G06F 15/50
[52] U.S. Cl. .................................. 364/450; 364/571; 340/988

[58] Field of Search ............... 364/424, 447, 449, 450, 364/457, 571; 340/988, 992

[56] References Cited

U.S. PATENT DOCUMENTS

| | | | |
|---|---|---|---|
| 3,849,636 | 11/1974 | Helms | 364/450 |
| 4,031,630 | 6/1977 | Fowler | 364/571 |
| 4,032,758 | 6/1977 | Lewis | 364/457 |
| 4,055,750 | 10/1977 | Jellinek | 340/988 |
| 4,084,241 | 4/1978 | Tsumura | 364/450 |
| 4,388,608 | 6/1983 | Bernard | 340/992 |

Primary Examiner—Gary Chin
Attorney, Agent, or Firm—Michael J. Striker

[57] ABSTRACT

A method and a device for target tracking of land vehicles are suggested, in particular for use in heavily meshed city road systems. Thereby, a motor vehicle device is used with an input device for a desired target location and an output device for vehicle instructions. The vehicle location (determination of travel path and travel direction) is carried out by picking up and evaluating the wheel rotations of a nondriven vehicle axis.

3 Claims, 2 Drawing Figures

F I G. 1
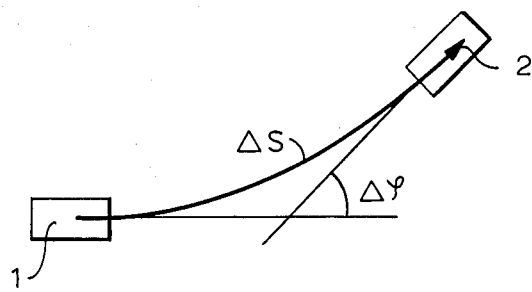
F I G. 2
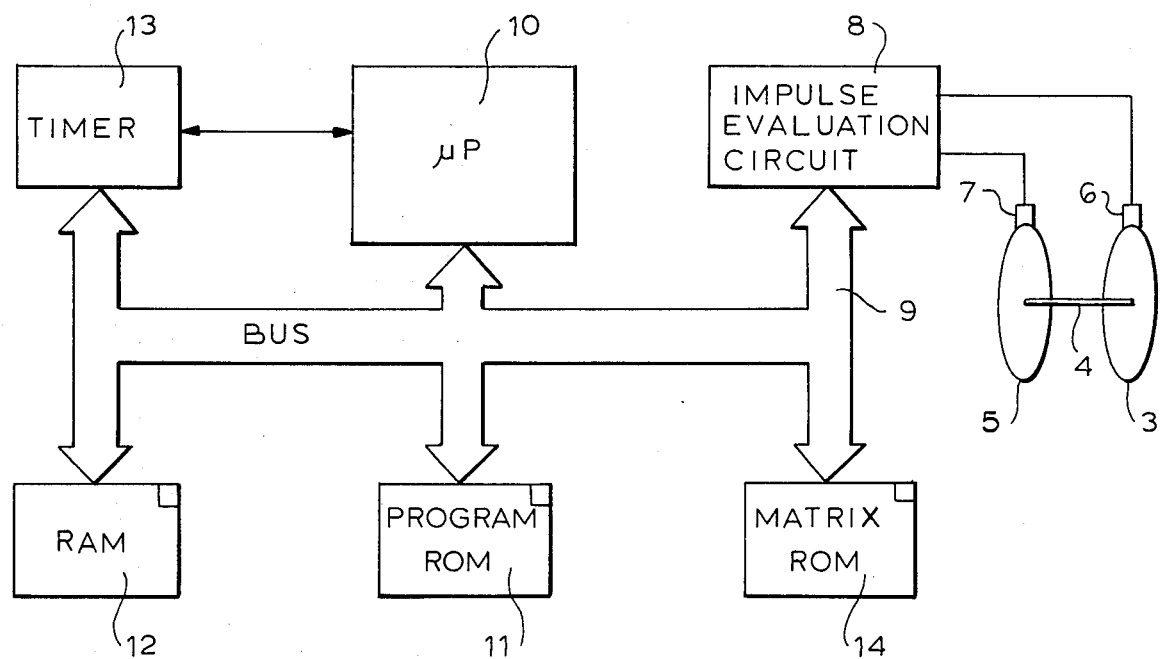

METHOD AND DEVICE FOR TARGET TRACKING OF LAND VEHICLES

BACKGROUND OF THE INVENTION

Methods and devices for target tracking of vehicles on land are very well known. For example, the DE-OS No. 29 25 656 describes a method for target tracking of vehicles in heavily meshed city road systems by using a vehicle autonomous system. Informations are exchanged between the vehicle and the road station at defined locations in the road system which enable the vehicle computer to define the position and direction of the vehicle. The further travel path and the further travel direction is then determined by picking up and evaluating the wheel rotations. For example, methods and devices for defining of drive angle and drive path are known from the article of T. Tsumura and N. Fujiwara, an experimental system for processing movement information of vehicle, Twenty-Eighth IEEE Vehicular-Technology Conference, Conference Record of Papers, page 163 to 168 and by the article of Jon H. Myer, A Vehicular Planimetric Dead Reckoning Computer, IEEE Transactions on Vehicular Technology, Volume 20, No. 2, August 1971, page 62 to 68. In the known methods, the drive path is determined from the sum of the wheel rotations of the left and the right wheel and the drive angle from the difference of the rotations of the right and the left wheel. It now has been shown that errors occur in particular when defining the drive angle, which cannot be considered negligible if large distances occur between the road stations or if the driver deviates from the preplanned route and therefore does not reach a road station for a longer period of time. Due to the additive misrepresentation of the angle values of the vehicle autonomous locating and navigation system it is then no longer possible to give indications to the driver with which he could reach the desired target location safely and rapidly.

SUMMARY OF THE INVENTION

The method in accordance with the invention and with the characterizing features of the claims has the advantage over the state of the art in that no location errors occur by the road stations even at longer drives without synchronisation. This results in a further advantage in that road stations may be placed at larger distances. As a further advantage the location errors do not occur even after longer drives. A further advantage is that the influence of the speed and the transverse acceleration of the vehicle can be neglected as far as location is concerned.

BRIEF DESCRIPTION OF THE DRAWING

One exemplified embodiment of the invention is illustrated in the drawing and is explained in detail in the following description. FIG. 1 shows an illustration explaining the locating system and FIG. 2 shows a device in accordance with the invention of a locating system for land vehicles.

DESCRIPTION OF THE EXEMPLIFIED EMBODIMENT

Methods for location of land vehicles by means of target tracking in accordance with the planimetric method are known for a long time. In this context we would like to refer to the state of the art mentioned in the statement of invention. The determination of travel path and travel direction is carried out in the known methods by picking up and evaluating the wheel rotations of a vehicle axis which preferably is not driven. Impulse transmitters on the wheels of this axis generate impulses per wheel rotation which are counted by the locating system and from which the position changes of the vehicle are calculated. For example, if a vehicle travels from location 1 in FIG. 1 to location 2, the travel path $\Delta S$ is defined in accordance with the following equation $$\Delta S = Z_R + Z_L/2 \cdot U/Z,$$

whereby $Z_R$ is the impulse number which is detected or picked up at the right wheel and $Z_L$ is the impulse number which is picked up at the left wheel. Z indicates the number of the impulses per a wheel rotation and U defines the wheel circumference.

The drive angle $\phi$ is calculated by the equation $$\phi = Z_R - Z_L/b \cdot U/Z,$$

whereby as a further value the wheel base b of the vehicle is of importance.

During curve travel the wheel base b (assumed to be constant in the second equation) is not constant since the engagement faces of the vehicle tires displace relative to each other during the curve travel in dependency from the travel speed. This results in a false determination of the impulse differences $Z_R - Z_L$ and therefore in location errors. These errors can be eliminated in that the determined drive angle $\phi$ is corrected with a value K. The value K is a factor which conventionally is in a range of 0.5 to 2 and which depends from the speed of the vehicle and the curve radius. Thus, it depends on the transverse forces which act on the vehicle. The speed of the vehicle and the curve radius of the vehicle can be determined with the already defined dimensions. Thereby, the measured impulse difference $Z_R - Z_L$ is inversely proportional to the curve radius, but the measured impulse sum is directly proportional to the curve radius. The speed is determined from the impulse sum and the travel time until reaching a predetermined impulse sum. From values one can determine the constant value K for correcting the drive angle.

The error correction is now carried out in that the measured impulse differences are replaced by a corrected value which, as described above, depends from speed and the curve radius. The determined corrected values depend on the type of the vehicle.

FIG. 2 illustrates a concrete exemplified embodiment wherein in a simple manner specific vehicle characteristics are taken into consideration. The non-driven axis 4 of a vehicle is schematically illustrated. Gear rims 3 and 5 are mounted on the right and left wheel of this axis. The gear rims 3,5 act on impulse transmitters 6 and 7. The signals of the impulse transmitters 6,7 are applied to an evaluation circuit 8 which is described in detail in the mentioned state of the art. The transmitter signal evaluation circuit converts these signals into digital signals which can be easily processed by a computer device 10. The computer device 10 is a microprocessor and is connected by means of a bus line 9 with the evaluation circuit 8, a program-ROM 11, a RAM 12, a matrix-ROM 14 and a timer 13.

The impulse transmitters 6 and 7 deliver the impulses which are required for determining the travel path and the travel direction. These impulses are prepared in the transmitter signal evaluation circuit 8, so that they can be easily processed by the microprocessor 10. The processing by the microprocessor is carried out by a program which is stored in program ROM 11. RAM 12 serves to store the data, for example, the travel direction and the travel path which were calculated by the microprocessor. The program determines the travel direction and the travel path according to the aforementioned equations, for example. The timer 13 serves to measure the traveling time. The error correction is now carried out in that the measured impulse differences $Z_R - Z_L$ are replaced by correction values K which are contained in a three dimensional correction matrix. The three dimensional correction matrix is stored in the matrix-ROM 14. Each matrix element is defined by three magnitudes, namely the measured impulse difference between the outputs of the two transmitt as 6,7, the impulse sum and a time which is required for picking up the given impulse sum and which is counted by timer 13. A corresponding matrix element is called up in dependency on these three variable and the K value is read out. Thus, the exact drive angle is now obtained in that the originally calculated drive angle is corrected by the factor K. Advantageously, this is carried out in that the value $Z_R - Z_L$ is replaced by a new value which is taken from the matrix-ROM 14.

The determination of the values of the matrix elements (K values) is carried out either empirically in drive tests, or is calculated in view of the different vehicle, chassis and tire types. By correcting the error by means of the matrix-ROM 14, it is possible to use the location device in all vehicles. With different vehicle types it is merely required to choose a matrix-ROM which is adjusted to the corresponding type of vehicle. Thereby, it is possible to correct location errors in dependency from the travel speed and from the non-constant wheel base during curve travels.

What is claimed:

1. A method of tracking position of a land vehicle by means of a planimetric dead reckoning navigation whereby the travel path and the travel direction are ascertained by detecting and evaluating information about rotations of two wheels on a vehicle axis, comprising the steps of preparing for a particular type of the vehicle a set of correction factors, selecting a corresponding correction factor based on the sum of rotations of one of said two wheels, the difference between the rotations of said two wheels, and the time required for detecting and evaluating said rotations; and defining an actual travel direction of said vehicle by correcting the ascertained travel direction by said corresponding correction factor.

2. A device for tracking position of a land vehicle by means of a planimetric dead reckoning navigation, comprising two impulse transmitters for detecting rotations of two wheels on a vehicle axis, a computing device for evaluating signals from said impulse transmitters and computing the travel path and the travel direction from the evaluated signals; a timer for counting the time of the detection evaluation of said signals; and means for storing a set of predetermined factors; and correction means for selecting a corresponding correction factor in said set based on the three variables corresponding to the sum of rotations of one of said wheels, the difference between the rotations of said wheels and the time required for the detection and evaluation of said rotations; said correction means corrects the computed travel direction by said selected corresponding correction factor.

3. A device as defined in claim 2 wherein said storing means includes a ROM connected to said computing device and storing a three dimensional matrix of said correction factors arranged according to said three variables.

* * * * *